US009038366B2

(12) United States Patent
Merry et al.

(10) Patent No.: US 9,038,366 B2
(45) Date of Patent: May 26, 2015

(54) LPC FLOWPATH SHAPE WITH GAS TURBINE ENGINE SHAFT BEARING CONFIGURATION

(71) Applicant: United Technologies Corporation, Harford, CT (US)

(72) Inventors: Brian D. Merry, Andover, CT (US); Gabriel L. Suciu, Glastonbury, CT (US); Lisa I. Brilliant, Middletown, CT (US); Becky E. Rose, Colchester, CT (US); Yuan Dong, Glastonbury, CT (US); Stanley J. Balamucki, Marlborough, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 14/067,354

(22) Filed: Oct. 30, 2013

(65) Prior Publication Data
US 2014/0248129 A1 Sep. 4, 2014

Related U.S. Application Data

(63) Continuation-in-part of application No. 13/904,416, filed on May 29, 2013, which is a continuation of application No. 13/762,970, filed on Feb. 8, 2013, now Pat. No. 8,511,061, which is a continuation of
(Continued)

(51) Int. Cl.
F02K 3/02 (2006.01)
F02C 1/06 (2006.01)
(Continued)

(52) U.S. Cl.
CPC .............. F02C 3/13 (2013.01); F01D 25/162 (2013.01); F02K 3/04 (2013.01); F02C 7/36 (2013.01); F02C 9/18 (2013.01); F01D 5/143 (2013.01)

(58) Field of Classification Search
USPC .......................... 60/226.1, 268, 795
See application file for complete search history.

(56) References Cited

U.S. PATENT DOCUMENTS 2,672,726 A 3/1954 Wolf et al.
2,798,360 A 7/1957 Hazen et al.
(Continued)

FOREIGN PATENT DOCUMENTS

EP 1013889 8/2005
EP 2060809 2/2011
EP 2559913 2/2013

OTHER PUBLICATIONS

Gunston, Bill, "Jane's Aero-Engines," Issue Seven, 2000, pp. 510-512.
(Continued)

Primary Examiner — Gerald L Sung
(74) Attorney, Agent, or Firm — Carlson, Gaskey & Olds, P.C.

(57) ABSTRACT

A gas turbine engine includes a core housing that includes an inlet case and an intermediate case that respectively provide an inlet case flow path and an intermediate case flowpath. A shaft provides a rotational axis. A hub is operatively supported by the shaft. A rotor is connected to the hub and supports a compressor section. The compressor section is arranged in a core flow path axially between the inlet case flow path and the intermediate case flow path. The core flowpath has an inner diameter and an outer diameter. At least a portion of inner diameter has an increasing slope angle relative to the rotational axis. A bearing is mounted to the hub and supports the shaft relative to one of the intermediate case and the inlet case.

22 Claims, 4 Drawing Sheets

Related U.S. Application Data application No. 13/362,170, filed on Jan. 31, 2012, now Pat. No. 8,402,741.

(60) Provisional application No. 61/860,334, filed on Jul. 31, 2013.

(51) Int. Cl.

| | |
|---|---|
| F02C 3/13 | (2006.01) |
| F01D 25/16 | (2006.01) |
| F02K 3/04 | (2006.01) |
| F02C 7/36 | (2006.01) |
| F02C 9/18 | (2006.01) |
| F01D 5/14 | (2006.01) |

(56) References Cited

U.S. PATENT DOCUMENTS

| | | |
|---|---|---|
| 2,850,337 A | 9/1958 | McCallum |
| 3,434,288 A | 3/1969 | Petrie |
| 3,549,272 A | 12/1970 | Bouiller et al. |
| 3,638,428 A | 2/1972 | Shipley et al. |
| 3,673,802 A | 7/1972 | Krebs et al. |
| 3,680,309 A | 8/1972 | Wallace, Jr. |
| 3,727,998 A | 4/1973 | Haworth et al. |
| 3,737,109 A | 6/1973 | Johansson |
| 3,738,719 A | 6/1973 | Langner |
| 3,747,343 A | 7/1973 | Rosen |
| 3,761,042 A | 9/1973 | Denning |
| 3,792,586 A | 2/1974 | Kasmarik et al. |
| 3,896,615 A | 7/1975 | Slatkin et al. |
| 3,925,979 A | 12/1975 | Ziegler |
| 3,971,208 A | 7/1976 | Schwent |
| 4,003,199 A | 1/1977 | Bell et al. |
| 4,055,946 A | 11/1977 | Sens |
| 4,084,861 A | 4/1978 | Greenberg et al. |
| 4,251,987 A | 2/1981 | Adamson |
| 4,452,037 A | 6/1984 | Waddington et al. |
| 4,500,143 A | 2/1985 | Kervistin et al. |
| 4,523,864 A | 6/1985 | Walter et al. |
| 4,687,346 A | 8/1987 | Suciu |
| 4,704,862 A | 11/1987 | Dennison |
| 4,727,762 A | 3/1988 | Hayashi |
| 4,782,658 A | 11/1988 | Perry |
| 4,827,712 A | 5/1989 | Coplin |
| 4,867,655 A | 9/1989 | Barbic et al. |
| 4,911,610 A | 3/1990 | Olschewski et al. |
| 4,916,894 A | 4/1990 | Adamson et al. |
| 4,951,461 A | 8/1990 | Butler |
| 4,952,076 A | 8/1990 | Wiley, III et al. |
| 4,981,415 A | 1/1991 | Marmol et al. |
| 5,051,005 A | 9/1991 | Duncan |
| 5,127,794 A | 7/1992 | Burge et al. |
| 5,155,993 A | 10/1992 | Baughman et al. |
| 5,174,525 A | 12/1992 | Schilling |
| 5,380,155 A | 1/1995 | Varsik et al. |
| 5,410,870 A | 5/1995 | Brault et al. |
| 5,433,674 A | 7/1995 | Sheridan et al. |
| 5,553,449 A | 9/1996 | Rodgers et al. |
| 5,622,438 A | 4/1997 | Walsh et al. |
| 5,687,561 A | 11/1997 | Newton |
| 5,791,789 A | 8/1998 | Van Duyn et al. |
| 5,806,303 A | 9/1998 | Johnson |
| 5,809,772 A | 9/1998 | Giffin, III et al. |
| 5,860,275 A | 1/1999 | Newton et al. |
| 5,867,980 A | 2/1999 | Bartos |
| 6,082,959 A | 7/2000 | Van Duyn |
| 6,148,518 A | 11/2000 | Weiner et al. |
| 6,158,210 A | 12/2000 | Orlando |
| 6,203,273 B1 | 3/2001 | Weiner et al. |
| 6,338,609 B1 | 1/2002 | Decker et al. |
| 6,439,772 B1 | 8/2002 | Ommundson et al. |
| 6,464,401 B1 | 10/2002 | Allard |
| 6,619,030 B1 | 9/2003 | Seda et al. |
| 6,623,166 B2 | 9/2003 | Andren et al. |
| 6,732,502 B2 | 5/2004 | Seda et al. |
| 6,942,451 B1 | 9/2005 | Alexander et al. |
| 7,004,722 B2 | 2/2006 | Teramura et al. |
| 7,412,819 B2 | 8/2008 | Bart et al. |
| 7,487,630 B2 | 2/2009 | Weiler |
| 7,490,460 B2 | 2/2009 | Moniz et al. |
| 7,493,753 B2 | 2/2009 | Moniz et al. |
| 7,500,365 B2 | 3/2009 | Suciu et al. |
| 7,591,594 B2 | 9/2009 | Charier et al. |
| 7,634,916 B2 | 12/2009 | Mace et al. |
| 7,694,505 B2 | 4/2010 | Schilling |
| 7,704,178 B2 | 4/2010 | Sheridan et al. |
| 7,730,715 B2 | 6/2010 | Grudnoski et al. |
| 7,832,193 B2 | 11/2010 | Orlando et al. |
| 7,882,693 B2 | 2/2011 | Schilling |
| 7,883,315 B2 | 2/2011 | Suciu et al. |
| 8,075,261 B2 | 12/2011 | Merry et al. |
| 8,104,262 B2 | 1/2012 | Marshall |
| 8,225,593 B2 * | 7/2012 | Le Hong et al. ............... 60/268 |
| 8,337,149 B1 | 12/2012 | Hasel et al. |
| 8,402,741 B1 | 3/2013 | Merry et al. |
| 2001/0047651 A1 | 12/2001 | Fukutani |
| 2005/0150204 A1 | 7/2005 | Stretton et al. |
| 2005/0265825 A1 | 12/2005 | Lewis |
| 2006/0090451 A1 | 5/2006 | Moniz et al. |
| 2006/0130456 A1 | 6/2006 | Suciu et al. |
| 2006/0196164 A1 | 9/2006 | Donohue |
| 2006/0239845 A1 | 10/2006 | Yamamoto et al. |
| 2007/0084183 A1 | 4/2007 | Moniz et al. |
| 2007/0087892 A1 * | 4/2007 | Orlando et al. ............... 475/348 |
| 2007/0251210 A1 | 11/2007 | Ceric et al. |
| 2008/0053062 A1 | 3/2008 | Tuttle |
| 2008/0098715 A1 | 5/2008 | Orlando et al. |
| 2008/0098717 A1 | 5/2008 | Orlando et al. |
| 2008/0148707 A1 | 6/2008 | Schilling |
| 2008/0152477 A1 | 6/2008 | Moniz et al. |
| 2008/0155961 A1 | 7/2008 | Johnson |
| 2009/0056306 A1 | 3/2009 | Suciu et al. |
| 2009/0081039 A1 | 3/2009 | McCune et al. |
| 2009/0123271 A1 | 5/2009 | Coffin et al. |
| 2009/0180864 A1 | 7/2009 | Alvanos et al. |
| 2009/0314881 A1 | 12/2009 | Suciu et al. |
| 2010/0058735 A1 | 3/2010 | Hurwitz et al. |
| 2010/0105516 A1 | 4/2010 | Sheridan et al. |
| 2010/0170224 A1 | 7/2010 | Clark et al. |
| 2010/0223903 A1 | 9/2010 | Starr |
| 2011/0047959 A1 | 3/2011 | DiBenedetto |
| 2011/0123326 A1 | 5/2011 | DiBenedetto et al. |
| 2011/0130246 A1 | 6/2011 | McCune et al. |
| 2011/0219781 A1 | 9/2011 | Benjamin et al. |
| 2012/0195753 A1 | 8/2012 | Davis et al. |
| 2012/0243971 A1 | 9/2012 | McCune et al. |
| 2012/0257960 A1 | 10/2012 | Reinhardt et al. |
| 2013/0023378 A1 | 1/2013 | McCune et al. |
| 2013/0192198 A1 | 8/2013 | Brilliant et al. |
| 2013/0319006 A1 * | 12/2013 | Parnin et al. .................. 60/805 |

OTHER PUBLICATIONS

Fledderjohn, "The TFE731-5: Evolution of a Decade of Business Jet Service," SAE Technical Paper, Business Aircraft Meeting & Exposition, Apr. 12-15, 1983.

International Search Report for PCT Application No. PCT/US2013/020462, Jul. 30, 2013.

International Preliminary Report on Patentability for PCT Application No. PCT/US2013/020462 date of issuance Aug. 5, 2014.

Walsh et al., "Gas Turbine Performance," 1998, 2004, Blackwell Science Ltd., Chapter 5, pp. 159-177.

International Search Report and Written Opinion for International Application No. PCT/US2014/043184 mailed Dec. 4, 2014.

International Search Report and Written Opinion for PCT/US14/43175 completed on Dec. 17, 2014.

* cited by examiner

LPC FLOWPATH SHAPE WITH GAS TURBINE ENGINE SHAFT BEARING CONFIGURATION

CROSS REFERENCE TO RELATED APPLICATIONS

This application claims priority to provisional application No. 61/860,334 filed Jul. 31, 2013, and this application is a continuation-in-part of U.S. application Ser. No. 13/904,416 filed on May 29, 2013, which is a continuation of U.S. application Ser. No. 13/762,970 filed on Feb. 8, 2013, now U.S. Pat. No. 8,511,061 issued Aug. 20, 2013, which is a continuation of U.S. application Ser. No. 13/362,170 filed on Jan. 31, 2012, now U.S. Pat. No. 8,402,741 issued Mar. 26, 2013.

BACKGROUND

Turbomachines, such as gas turbine engines, typically include a fan section, a turbine section, a compressor section, and a combustor section. The fan section drives air along a core flow path into the compressor section. The compressed air is mixed with fuel and combusted in the combustor section. The products of combustion are expanded in the turbine section.

A typical jet engine has two or three spools, or shafts, that transmit torque between the turbine and compressor sections of the engine. Each of these spools is typically supported by two bearings. One bearing, for example, a ball bearing, is arranged at a forward end of the spool and is configured to react to both axial and radial loads. Another bearing, for example, a roller bearing is arranged at the aft end of the spool and is configured to react only to radial loads. This bearing arrangement fully constrains the shaft except for rotation, and axial movement of one free end is permitted to accommodate engine axial growth.

Commercial turbofan engines typically use low pressure compressors coupled to a fan. Advances in coupling the fan to the low pressure compressor have allowed the compressor to operate at higher speeds and to decrease the number of compressor stages required of the compressor. Decreasing the number of stages and increasing the rotational speed of the low pressure compressor causes existing flowpath designs to be non-optimal and may result in decreased performance when the existing flowpath designs are used.

SUMMARY

In one exemplary embodiment, a gas turbine engine includes a core housing that includes an inlet case and an intermediate case that respectively provide an inlet case flow path and an intermediate case flowpath. A shaft provides a rotational axis. A hub is operatively supported by the shaft. A rotor is connected to the hub and supports a compressor section. The compressor section is arranged in a core flow path axially between the inlet case flow path and the intermediate case flow path. The core flowpath has an inner diameter and an outer diameter. At least a portion of inner diameter has an increasing slope angle relative to the rotational axis. A bearing is mounted to the hub and supports the shaft relative to one of the intermediate case and the inlet case.

In a further embodiment of the above, the outer diameter has an outer diameter slope angle relative to the rotational axis along a fluid flow direction of the core flow path of between about 0 degrees and about 15 degrees.

In a further embodiment of the above, a fan is connected to the shaft through a geared architecture. The compressor section is a low pressure compressor.

In a further embodiment of the above, the outer diameter slope angle decreases relative to the rotational axis.

In a further embodiment of the above, the outer diameter slope angle is in the range of about 0 degrees to about 10 degrees.

In a further embodiment of the above, the outer diameter slope angle is in the range of about 5 degrees to about 7 degrees.

In a further embodiment of the above, the outer diameter slope angle is about 6 degrees.

In a further embodiment of the above, a fan is connected to the shaft through a geared architecture. The compressor section is a low pressure compressor.

In a further embodiment of the above, the low pressure compressor comprises at least one variable vane.

In a further embodiment of the above, the low pressure compressor comprises an exit guide vane. The exit guide vane is located in a low pressure compressor outlet section of the core flow path.

In a further embodiment of the above, the low pressure compressor further comprises a low pressure bleed located between a low pressure compressor rotor and the exit guide vane.

In a further embodiment of the above, the low pressure bleed further comprises a bleed trailing edge, and wherein the bleed trailing edge extends into the core flow path beyond the outer diameter of the core flow path.

In a further embodiment of the above, the low pressure compressor is a multi-stage compressor.

In a further embodiment of the above, the inlet case includes a first inlet case portion that defines the inlet case flow path. A bearing support portion is removably secured to the inlet case portion. The bearing is mounted to the bearing support portion.

In a further embodiment of the above, the intermediate case includes an intermediate case portion that defines the intermediate case flow path. A bearing support portion is removably secured to the intermediate case portion. The bearing is mounted to the bearing support portion.

In a further embodiment of the above, the bearing is a ball bearing.

In a further embodiment of the above, the bearing is a first bearing and further comprises a second bearing that supports the shaft relative to the other of the intermediate case and the inlet case.

In a further embodiment of the above, the first and second bearings are arranged in separate sealed lubrication compartments.

In a further embodiment of the above, a geared architecture is coupled to the shaft. A fan is coupled to and rotationally driven by the geared architecture.

In a further embodiment of the above, the shaft includes a main shaft and a flex shaft. The flex shaft is secured to the main shaft at a first end and includes a second end opposite the first end. The geared architecture includes a sun gear supported on the second end.

In a further embodiment of the above, the shaft includes a hub secured to the main shaft. The compressor section includes a rotor mounted to the hub.

In a further embodiment of the above, the geared architecture includes a torque frame that supports multiple circumferentially arranged star gears that intermesh with the sun gear. The torque frame is secured to the inlet case.

In a further embodiment of the above, the rotor supports multiple compressor stages, and the bearing is axially aligned with and radially inward of one of the compressor stages.

In a further embodiment of the above, the compressor section includes a variable vane array.

In a further embodiment of the above, the geared architecture is arranged in the lubrication compartment.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
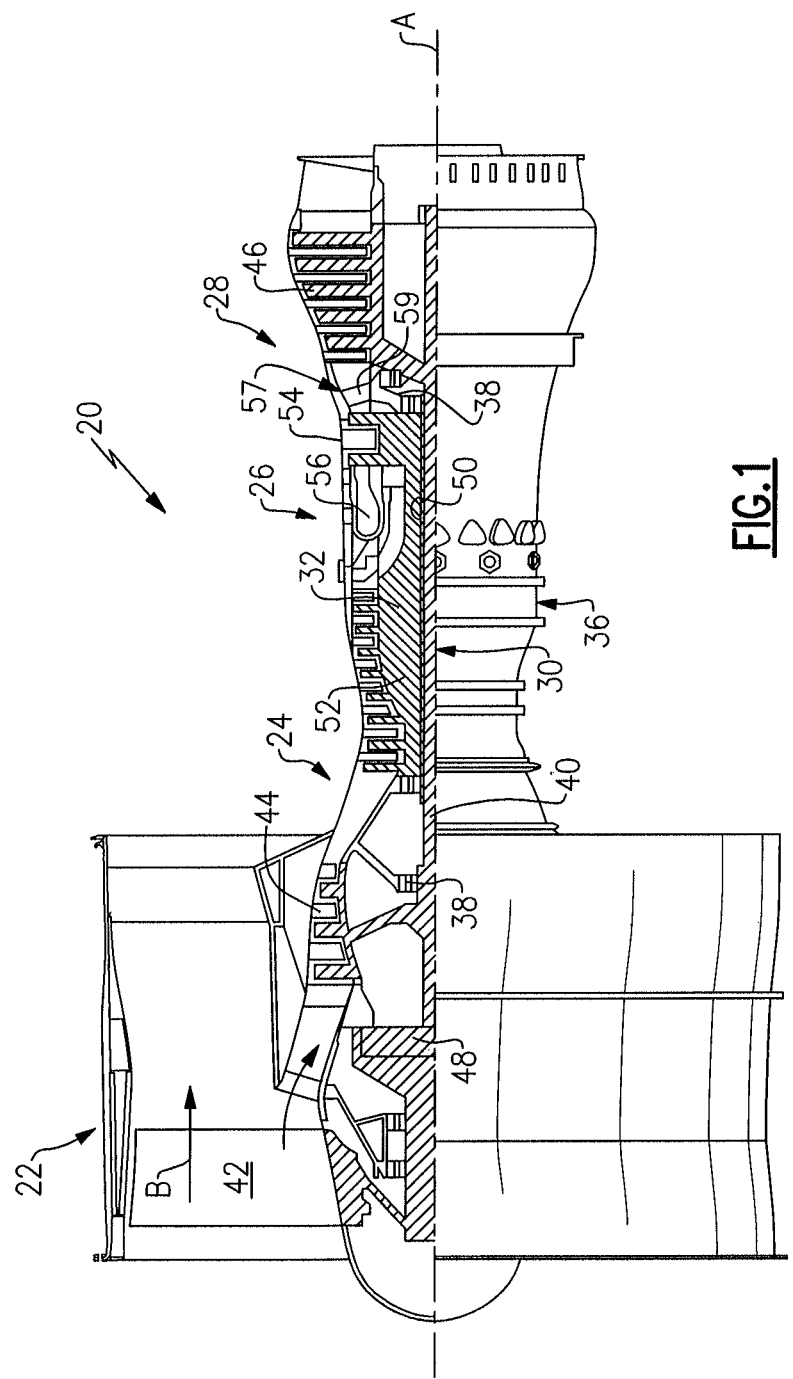
FIG. 1 schematically illustrates an embodiment of a gas turbine engine.
Figure 2:
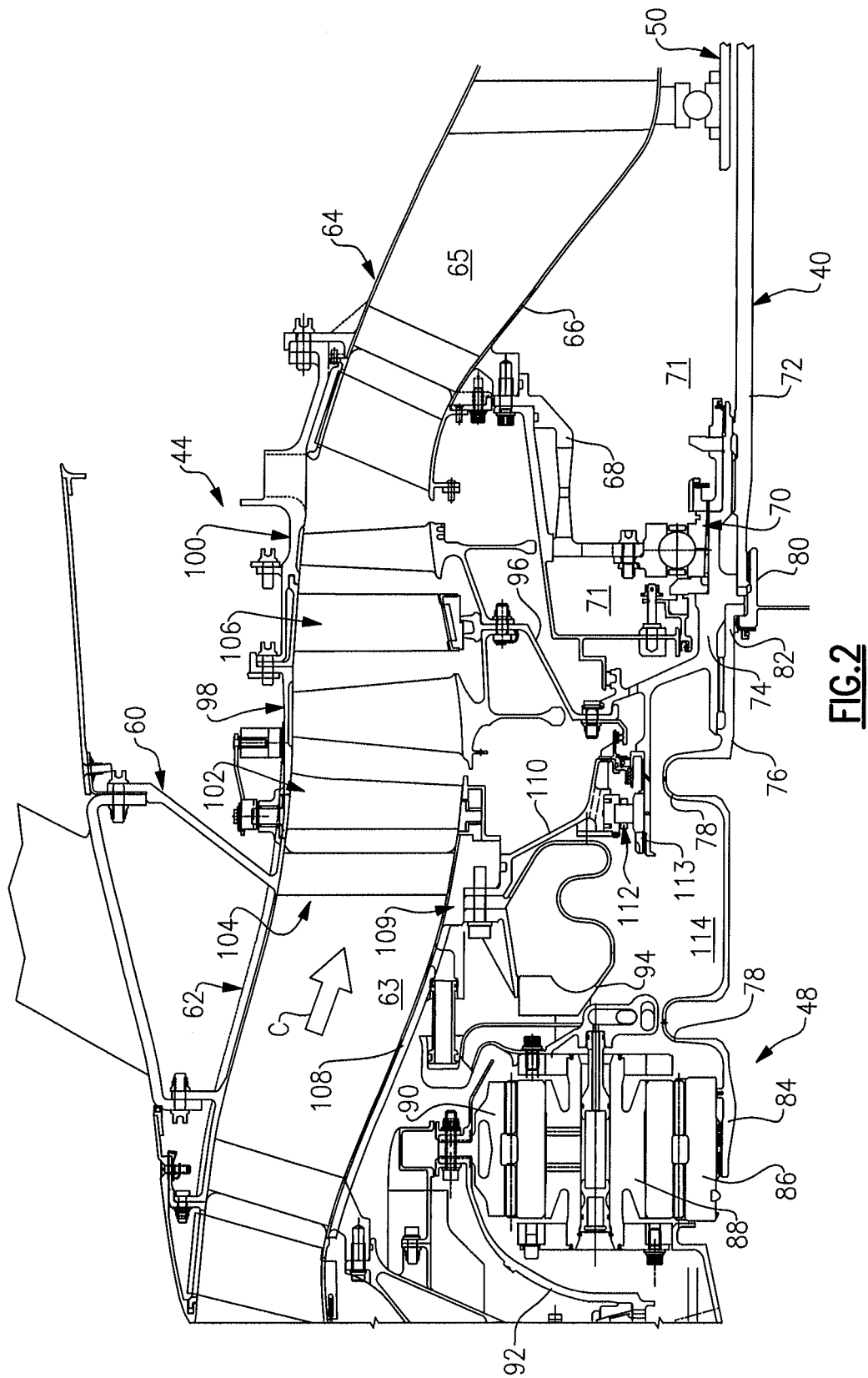
FIG. 2 is a cross-sectional view of a front architecture of the gas turbine engine embodiment shown in FIG. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C (as shown in FIG. 2) for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a gear reduction ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient}°R)/518.7°R)^{0.5}]$. The "Low corrected fan tip speed" as disclosed herein according to one non-limiting embodiment is less than about 1150 ft/second.

Referring to FIG. 2, a core housing 60 includes an inlet case 62 and an intermediate case 64 that respectively provide an inlet case flowpath 63 and a compressor case flowpath 65. In other embodiments, the core housing may include additional cases. Similarly, the compressor section as a whole may include any number of cases. Together, the inlet and compressor case flowpaths 63, 65, in part, define a core flowpath through the engine 20, which directs a core flow C.

The intermediate case 64 includes multiple components, including the intermediate case portion 66, and the bearing support 68 in the example, which are removably secured to one another. The bearing support portion 68 has a first bearing 70 mounted thereto, which supports the inner shaft 40 for rotation relative to the intermediate case 64. In one example, the first bearing 70 is a ball bearing that constrains the inner shaft 40 against axial and radial movement at a forward portion of the inner shaft 40. The first bearing 70 is arranged within a bearing compartment 71.

In the example, the inner shaft 40 is constructed of multiple components that include, for example, a main shaft 72, a hub 74 and a flex shaft 76, which are clamped together by a nut 80 in the example. The first bearing 70 is mounted on the hub 74 (i.e., low pressure compressor hub). The flex shaft 76 includes first and second opposing ends 82, 84. The first end 82 is splined to the hub 74, and the second end 84 is splined to and supports a sun gear 86 of the geared architecture 48. Bellows 78 in the flex shaft 76 accommodate vibration in the geared architecture 48.

The geared architecture includes star gears 88 arranged circumferentially about and intermeshing with the sun gear 86. A ring gear 90 is arranged circumferentially about and intermeshes with the star gears 88. A fan shaft 92 is connected to the ring gear 90 and the fan 42 (FIG. 1). A torque frame 94 supports the star gears 88 and grounds the star gears 88 to the housing 60. In operation, the inner shaft 40 rotationally drives the fan shaft 92 with the rotating ring gear 90 through the grounded star gears 88.

The low pressure compressor 44 includes multiple compressor stages arranged between the inlet and intermediate case flowpaths 63, 65, for example, first and second compressor stages 98, 100, that are secured to the hub 74 by a rotor 96. The first bearing 70 is axially aligned with one of the first and second compressor stages 98, 100. In one example, a variable stator vane array 102 is arranged upstream from the first and second compressor stages 98, 100. Struts 104 are arranged upstream from the variable stator vane array 102. An array of fixed stator vanes 106 may be provided axially between the first and second compressor stages 98, 100. Although a particular configuration of low pressure compressor 44 is illustrated, it should be understood that other configurations may be used and still fall within the scope of this disclosure.

The inlet case 62 includes inlet case portions 108, and bearing support 110, which are removably secured to one another. The bearing support portion 110 and torque frame 94 are secured to the inlet case portion 108 at a joint 109. The bearing support portion 110 supports a second bearing 112, which is a rolling bearing in one example. The second bearing 112 is retained on the hub 74 by a nut 113, for example, and is arranged radially outward from the flex shaft 76 and radially between the torque frame 94 and flex shaft 76. In the example, the second bearing 112 is axially aligned with and radially inward of the variable stator vane array 102. The geared architecture 48 and the second bearing 112 are arranged in a lubrication compartment 114, which is separate from the bearing compartment 71 in the example.

Figure 3:
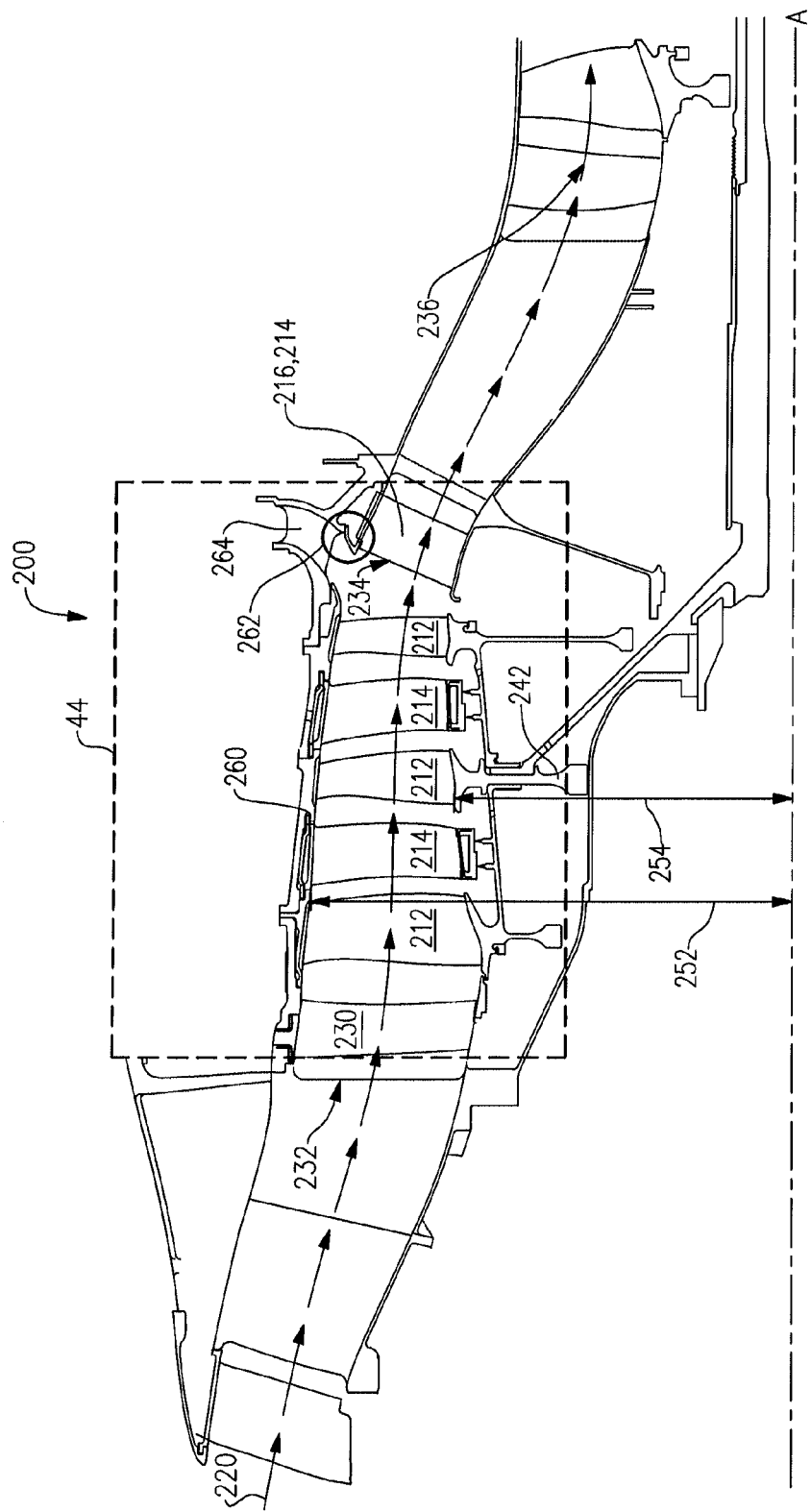
FIG. 3 contextually illustrates an example core flowpath through a low pressure compressor of the gas turbine engine embodiment of FIG. 1.

With continued reference to FIG. 1, FIG. 3 is a sectional view of the gas turbine engine 20 of FIG. 1, contextually illustrating a low pressure compressor 44 of the gas turbine engine 20. The core flowpath, identified herein as flowpath 220 or core flowpath 220, passes through the low pressure compressor 44 of the gas-turbine engine 20. The low pressure compressor 44 includes multiple rotor 212/vane 214 pairs that serve to drive air through the core flowpath 220. The rotors 212 are connected to an inner shaft 40 via a compressor frame 242. Interspersed between each of the rotors 212 is a vane 214. The vanes 214 are connected to an outer frame 260. Additional stages can be added or removed depending on design constraints via the addition or removal of rotor 212/vane 214 pairs. A variable guide vane 230 is located at an inlet 232 of the low pressure compressor 44. Alternately, one or more of the vanes 214 could also be a variable vane 230. An exit guide vane 216 is located at a fluid outlet 234 of the low pressure compressor 44. In the illustrated example of FIG. 3, the exit guide vane 216 also acts as a vane 214 corresponding to the last rotor 212 of the low pressure compressor 44. The illustrated low pressure compressor 44 is referred to as a three stage compressor as three rotor 212/vane 214 pairs (including vane 216) are included.

The core flowpath 220 has an inner diameter 254 and an outer diameter 252 measured with respect to the engine longitudinal axis A. As the core flowpath 220 passes through the low pressure compressor 44, the inner diameter 254 of the core flowpath 220 slopes outward or parallel to relative to the engine central longitudinal axis A away from the engine central longitudinal axis A resulting in an increasing inner diameter 254 as the core flowpath 220 progresses along the direction of fluid flow. The increasing inner diameter 254 may more easily accommodate at least one of the first and second bearings 70, 112, packaged radially inward of the low pressure compressor 44. The outer diameter 252 may slope inward relative to the engine central longitudinal axis A toward the engine central longitudinal axis A to provide a further decreasing cross-sectional area core flowpath 220 that compresses air passing through the low pressure compressor 44.

A steeper slope angle of the outer diameter 252, relative to the engine central longitudinal axis A, may result in a greater average tip clearance between the rotor blade 212 and the engine case during flight. The additional tip clearance may increase flow separation in the air flowing through the core flowpath 220. By way of example, undesirable amounts flow separation can occur when the outer diameter 252 exceeds 15 degrees (absolute value) relative to the engine central longitudinal axis A.

Flow separation occurs when the air flow separates from the core flowpath 220 walls. By ensuring that the outer diameter 252 includes a sufficiently low slope angle relative to the engine central longitudinal axis A and then increasing the inner diameter 254, the flow separation resulting from the additional tip clearance may be eliminated (or at least greatly reduced), and the total amount of flow separation may be minimized. In some example embodiments, a slope angle of the outer diameter 252 is less than about 15 degrees (absolute value), and in some embodiments less than about 10 degrees (absolute value), relative to the engine central longitudinal axis A. In another example embodiment, the slope angle of the outer diameter 252 is approximately 6 degrees (absolute value) relative to the engine central longitudinal axis A.

Figure 4:
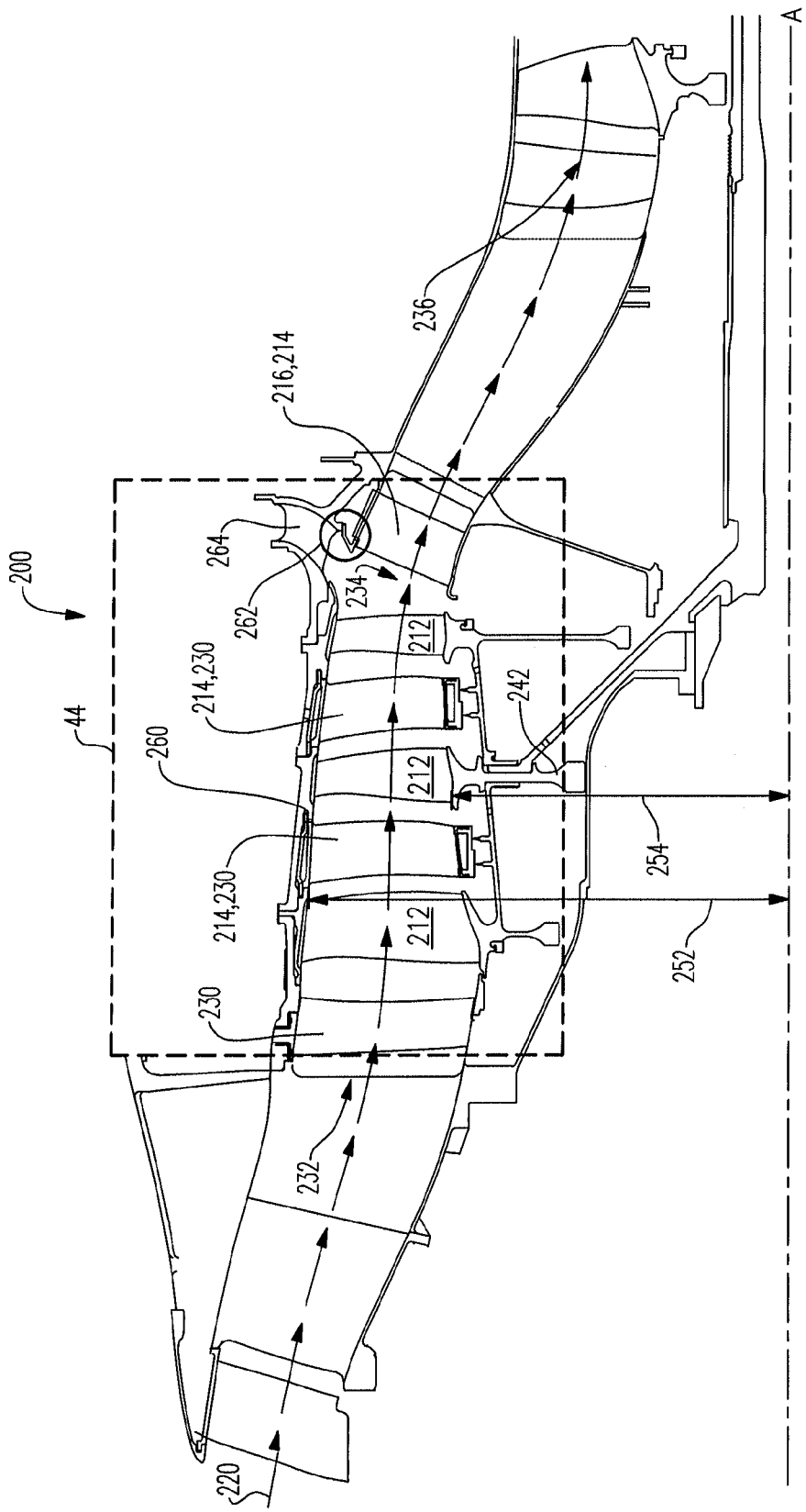
FIG. 4 contextually illustrates another example core flowpath through a low pressure compressor of the gas turbine engine embodiment of FIG. 1.

With continued reference to FIGS. 1 and 3, FIG. 4 illustrates an example core flowpath 220. In some example engine embodiments, air flow passing through the core flowpath 220 is insufficiently stable. In order to increase the stability of the fluid flow, and improve the pressure ratio of the low pressure compressor 44, one or more variable guide vanes 230 may be included in the flow path 220. In a three stage geared turbofan compressor 44, such as the one illustrated in FIG. 3, a single variable guide vane 230 can be utilized to sufficiently stabilize the air flow. However, alternate embodiments, such as those utilizing additional compressor stages, may require additional variable guide vanes 230. In such an embodiment, one or more of the vanes 214 can be the additional variable guide vanes 230. In alternate examples, the air flow can be sufficiently stable without the inclusion of a variable guide vane 230, and the variable guide vane 230 can be omitted.

In some example embodiments the exit guide vane 216 is incorporated into a low pressure compressor outlet 234 section of the core flowpath 220 between the exit of the low pressure compressor 44 and the entrance to the high pressure compressor 52. The low pressure compressor outlet 234 section of the core flowpath 220 is sloped inward (toward the engine central longitudinal axis A). Placing the exit guide vane 216 in the inward sloping low pressure compressor outlet 234 section of the core flowpath 220 cants the exit guide vane 216 and provides space for a low pressure bleed 264. The low pressure bleed 264 allows for dirt, rain and ice to be removed from the compressor 44. The low pressure bleed 264 additionally improves the stability of the fluid flowing through the core flowpath 220. The low pressure bleed 264 is positioned between the last (downstream most) rotor 212 and the exit guide vane 216. In some example embodiments a bleed trailing edge 262 of the low pressure bleed 264 can extend inward toward the engine central longitudinal axis A, beyond the outer diameter 252 of the core flowpath 220. In such an embodiment the outer diameter of the bleed trailing edge 262 of the low pressure bleed 264 is smaller than the outer diameter 252. Extending the bleed trailing edge 262 inwards allows the bleed 264 to scoop out more of the dirt, rain, ice or other impurities that may enter the core flowpath 220.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
    a core housing including an inlet case and an intermediate case that respectively provide an inlet case flow path and an intermediate case flowpath, wherein the inlet case includes a first inlet case portion defining the inlet case flow path, and a bearing support portion is removably secured to the inlet case portion;
    a fan arranged fluidly upstream of the core housing;
    a shaft providing a rotational axis;
    a geared architecture coupled to the shaft, and the fan coupled to and rotationally driven by the geared architecture;
    a hub operatively supported by the shaft;
    a rotor connected to the hub and supporting a compressor section arranged fluidly downstream from the inlet case, the compressor section being arranged in a core flow path axially between the inlet case flow path and the intermediate case flow path, the core flowpath having an inner diameter and an outer diameter, wherein the at least a portion of the inner diameter has an increasing slope angle relative to the rotational axis;
    a first bearing mounted to the hub and supporting the shaft relative to one of the intermediate case and the inlet case, the first bearing mounted to the bearing support portion; and
    a second bearing mounted to the hub and supporting the shaft relative to the other of the intermediate case and the inlet case.

2. The gas turbine engine according to claim 1, wherein the outer diameter has an outer diameter slope angle relative to the rotational axis along a fluid flow direction of the core flow path of between 0 degrees and 15 degrees.

3. The gas turbine engine according to claim 1, wherein the fan is connected to the shaft through the geared architecture, wherein the compressor section is a low pressure compressor.

4. The gas turbine engine according to claim 2, wherein the outer diameter slope angle decreases relative to the rotational axis.

5. The gas turbine engine according to claim 2, wherein the outer diameter slope angle is in the range of 0 degrees to 10 degrees.

6. The gas turbine engine according to claim 5, wherein the outer diameter slope angle is in the range of 5 degrees to 7 degrees.

7. The gas turbine engine according to claim 6, wherein the outer diameter slope angle is 6 degrees.

8. The gas turbine engine according to claim 4, wherein the fan is connected to the shaft through the geared architecture, wherein the compressor section is a low pressure compressor.

9. The gas turbine engine according to claim 8, wherein the low pressure compressor comprises at least one variable vane.

10. The gas turbine engine according to claim 8, wherein the low pressure compressor further comprises an exit guide vane, wherein the exit guide vane is located in a low pressure compressor outlet section of the core flow path.

11. The gas turbine engine according to claim 10, wherein the low pressure compressor further comprises a low pressure bleed located between a low pressure compressor rotor and the exit guide vane.

12. The gas turbine engine according to claim 11, wherein the low pressure bleed further comprises a bleed trailing edge, and wherein the bleed trailing edge extends into the core flow path beyond the outer diameter of the core flow path.

13. The gas turbine engine according to claim 8, wherein the low pressure compressor is a multi-stage compressor.

14. The gas turbine engine according to claim 1, wherein the intermediate case includes an intermediate case portion defining the intermediate case flow path, and a second bearing support portion removably secured to the intermediate case portion, the second mounted to the second bearing support portion.

15. The gas turbine engine according to claim 14, wherein the other bearing is a ball bearing.

16. The gas turbine engine according to claim 1, wherein the first and second bearings are arranged in separate sealed lubrication compartments.

17. The gas turbine engine according to claim 1, wherein the shaft includes a main shaft and a flex shaft, the flex shaft secured to the main shaft at a first end and including a second end opposite the first end, wherein the geared architecture includes a sun gear supported on the second end.

18. The gas turbine engine according to claim 17, wherein the hub is secured to the main shaft, and the compressor section includes a rotor mounted to the hub.

19. The gas turbine engine according to claim 18, wherein the geared architecture includes a torque frame supporting multiple circumferentially arranged star gears intermeshing with the sun gear, the torque frame secured to the inlet case.

20. The gas turbine engine according to claim 1, wherein the rotor supports multiple compressor stages, and the first bearing is axially aligned with and radially inward of one of the compressor stages.

21. The gas turbine engine according to claim 20, wherein the compressor section includes a variable vane array.

22. The gas turbine engine according to claim 1, comprising a lubrication compartment, wherein the geared architecture is arranged in the lubrication compartment.

* * * * *

UNITED STATES PATENT AND TRADEMARK OFFICE
CERTIFICATE OF CORRECTION

| | | |
|---|---|---|
| PATENT NO. | : 9,038,366 B2 | Page 1 of 1 |
| APPLICATION NO. | : 14/067354 | |
| DATED | : May 26, 2015 | |
| INVENTOR(S) | : Brian D. Merry | |

It is certified that error appears in the above-identified patent and that said Letters Patent is hereby corrected as shown below:

ON THE TITLE PAGE:

Item 71 Applicant information should read as follows:

--United Technologies Corporation
  Hartford, CT (US)--

Signed and Sealed this
Seventeenth Day of November, 2015

Michelle K. Lee
*Director of the United States Patent and Trademark Office*